United States Patent Office 3,519,534
Patented July 7, 1970

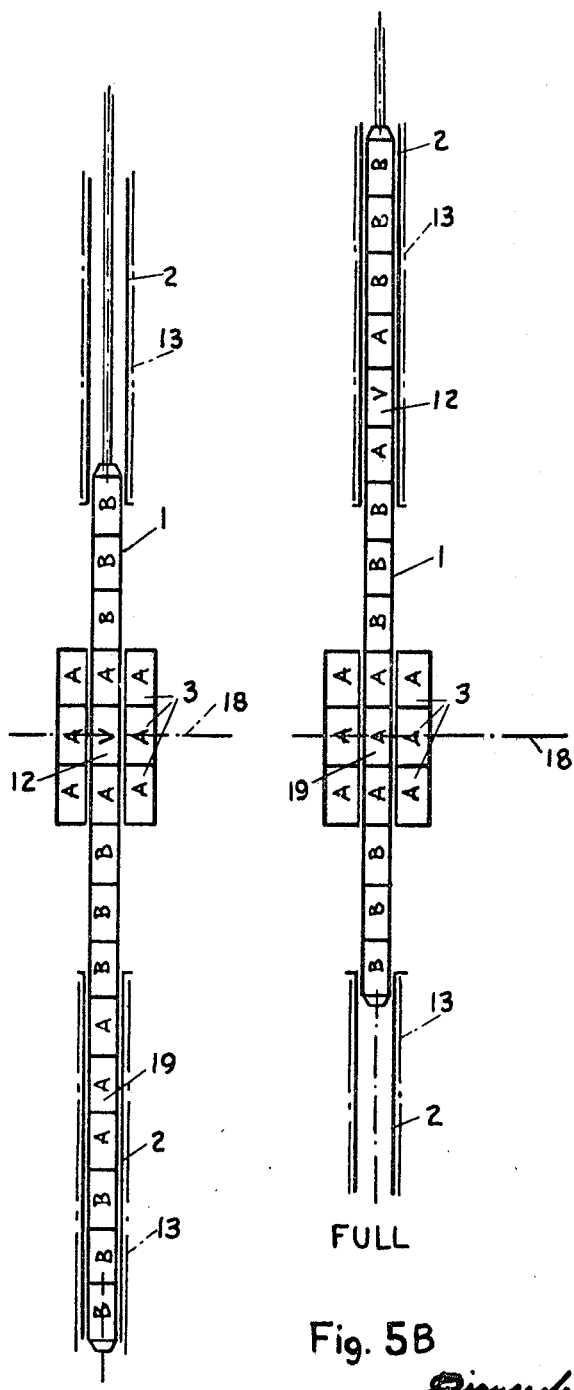
Fig. 5A EMPTY
Fig. 5B FULL

3,519,534
METHOD AND APPARATUS FOR MEASURING THE INFINITE MULTIPLICATION FACTOR OF NUCLEAR REACTOR SYSTEMS
Giancarlo Ghilardotti, Milan, and Giuseppe Brighenti, Bologna, Italy, assignors to SNAM Progetti S.p.A., Milan, Italy, a company of Italy
Filed July 13, 1967, Ser. No. 653,095
Claims priority, application Italy, July 14, 1966, 16,288/66
Int. Cl. G21c 17/00
U.S. Cl. 176—19
6 Claims

ABSTRACT OF THE DISCLOSURE

A method and apparatus for measuring the infinite multiplication factor of nuclear reactor systems by determining the amount of poison which reduces the infinite multiplication factor ($K_\infty$) to unity with the null reactivity method carried out by the oscillation technique of the pile oscillator method.

BACKGROUND AND OBJECTS OF THE INVENTION

The present invention relates generally to nuclear reactors, and relates more particularly to a new and improved method and apparatus for measuring the infinite multiplication factor ($K_\infty$) of nuclear reactors, having particular utility in reactors with compact lattices, such as light water-moderated reactors.

It is already known to the art to measure the $K_\infty$ of reactor lattices by the null reactivity method, which in turn, represents an application of the "danger coefficient" method, used originally for measuring neutron absorption cross sections. (For a description of the "danger coefficient" method, see Glasstone & Sesonske, Nuclear Reactor Engineering, p. 289 (D. Van Nostrand Co. 1963).)

The "danger coefficient" method, having its limitation in the need for stabilizing the reactor perfectly, evolved into the "pile oscillator" method (also described in Nuclear Reactor Engineering, supra) but, heretofore, the null reactivity method has been performed only with a stationary technique.

According to the known null reactivity method, a portion of the multiplying means under examination (testing section) is inserted into a research nuclear reactor and $Mx$ is defined as the amount of poison required to be added to the testing section so that the reactor reactivity will not change when the testing section is replaced with a void section, assuming that in the surroundings of the testing section there has been obtained a spatial and energetic configuration of the neutron flux similar to that existing in the infinite and critical multiplying means.

The amount $Mx$ of poison is related to the $K_x$ of the lattice under examination by the following relations:

$$\Sigma_x = \sigma_x \frac{N}{Ax} Mx \qquad (1)$$

$$(K_\infty - 1)\Sigma_a = \Sigma_x \qquad (2)$$

wherein, $\Sigma_a$ represents the absorption macroscopic cross section of the lattice under examination, $\Sigma_x$ is the absorption macroscopic cross section of the poison, $\sigma_x$ is the absorption microscopic cross section of the poison, $Ax$ the atomic weight of the poison and $N$ is the Avogadro number.

The presently known stationary technique for carrying out the null reactivity method includes the following operations: (a) measurement of the stable period of the reactor with the testing cell inserted in the reactor core; (b) shutdown of the reactor; (c) removal of the testing cell and of the overhanging column from the reactor; (d) re-insertion of the overhanging column into the reactor; (e) starting of the reactor; and (f) measurement of the stable period of the reactor, the testing cell being removed.

The method and apparatus of the present invention for measuring the infinite multiplication factor of nuclear reactor has the advantages over the stationary null reactivity method of: (a) shorter duration; (b) simpler execution; (c) better reproducibility; (d) minimum reactivity excursion; and (e) high measurement precision and sensitivity (few parts on $10^5$), reached by utilizing only a small portion of the lattice.

Because of its high sensitivity, the method of the present invention is particularly desirable for measurements on lattices with fuel elements which are expensive or are available only with difficulty as, for example, plutonium fuel elements.

Moreover, the method according to the present invention presents these other desirable advantages: (1) higher intrinsic accuracy of the measurement, owing to the fact that in the course of the measurement it is unnecessary to disassemble the testing part of the reactor; (2) an increment of the measurement accuracy is easily obtainable by increasing the number of the oscillations; and (3) the measurement is not sensitive to all disturbances of period different from the oscilation period and therefore it is not necessary to stabilize carefully the reactor against temperature and pressure variations.

It is therefore an object of the present invention to provide a new and improved method and apparatus for measuring the infinite multiplication factor of nuclear reactor systems.

Another object of the present invention is to provide a new and improved method and apparatus for measuring the infinite multiplication factor of nuclear reactor systems having compact lattices.

Another object of the present invention is to provide a new and improved method and apparatus for measuring the infinite multiplication factor of nuclear reactor systems, in which the oscillation technique of the pile oscillator method is applied to the null reactivity method.

Another object of the present invention is to provide, in a new and improved method and apparatus for measuring the infinite multiplication factor of a water-moderated nuclear reactor system by determining the amount of poison which reeduces the infinite multiplication factor of the lattice to unity, a poison in the form of an aqueous borate solution dissolved in the moderator, whose concentration may be continuously varied.

Another object of the present invention is to provide, in a new and improved method and apparatus for measuring the infinite multiplication factor of nuclear reactor systems, wherein a test section of multiplying material is oscillated into and out of the reactor core, a buffer zone in the reactor core which surrounds the test section and is comprised of multiplying material identical to that of the test section.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, steps, processes, arrangements, combinations and improvements herein shown and described.

SUMMARY OF THE INVENTION

Briefly described, the present invention is directed to a novel method and apparatus for measuring the infinite multiplication factor ($K_\infty$) of nuclear reactor systems, of particular utility with compact lattices such as those in light water-moderated reactors, in which the amount of poison which reduces the infinite multiplication factor to unity is measured by carrying out the null reactivity method with the oscillation technique of the pile oscillator method. According to the invention, a column member is provided containing a test section of multiplying material identical to that of the lattice nuclear reactor core and a void section. The column member is oscillated between a "full" position, where the test section is located in the center of the reactor core, and an "empty" position, where the void section is located in the center of the reactor core, during which time the reactivity of the reactor is continuously monitored. By measuring the amplitudes of the reactor power oscillations, which correspond to the mechanical oscillation of the column, as a function of increased amounts of poison added to the moderator, the amount of poison ($Mx$) required for a null amplitude power oscillation may be determined by graphical interpolation and, by consequent calculation, the infinite multiplication factor.

As preferably embodied, the test section and void section of the oscillating column are surrounded on each side by a composition similar to that of the lattice under examination and having the same overall geometric dimensions, and the oscillating column is received within a cadmium-plated sleeve on either side of the reactor core, whereby, when the column is oscillated from the "empty" position to the "full" position, no changes occur in the reactor core other than that the testing section is replaced by the void section.

Also as preferably embodied, a buffer structure is provided in the testing zone to provide spectral adjustment of the neutron flux, comprising a plurality of annular rings surrounding the oscillating column formed of cells of multiplying material identical in size and composition to the test section.

Also according to the invention, in the case of water-moderated lattices, the added poisoning is achieved by increasing the amount of borate solution dissolved in the water of the testing zone and of the buffer zone, whereby a poisoning is obtained which is uniform and perfectly $1/V$ variable in a continuous manner (wherein V is the neutron velocity).

It will be understood that the foregoing general description and the following detailed description as well are exemplary and explanatory of the invention but are not restrictive thereof.

The accompanying drawings, referred to herein and constituting a part hereof, illustrate one embodiment of the invention, and together with the description, serve to explain the principles of the invention.

BRIEF DESCRIPTION OF THE DRAWINGS

FIGS. 5A and 5B are diagrammatic showings of the oscillating system of the invention, FIG. 5A illustrating the "empty" position of the oscillating column, whereat the void section is located in the center of the reactor core, and FIG. 5B illustrating the "full" position of the oscillating column, whereat the test section is located in the center of the reactor core.

DESCRIPTION OF THE PREFERRED EMBODIMENT

Figure 1:
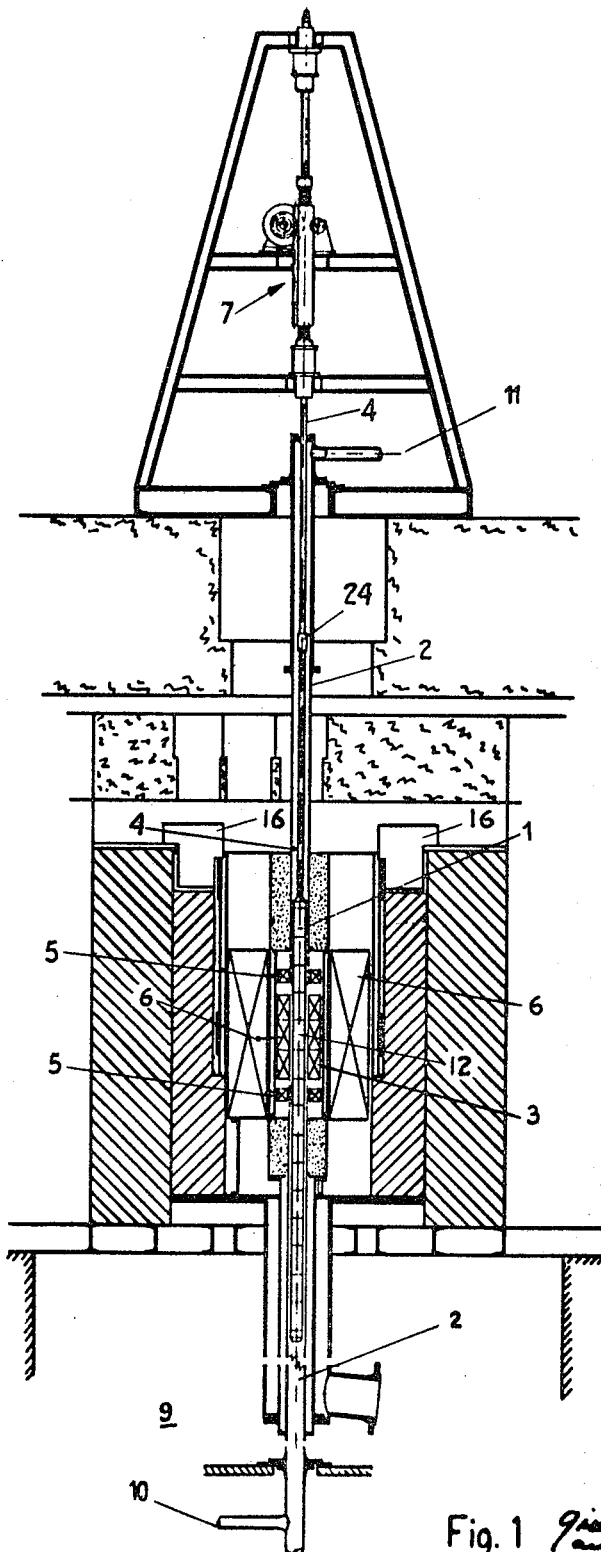
FIG. 1 is a fragmentary, vertical sectional view partly in elevation and partly schematic, illustrating the apparatus of the invention applied to a nuclear reactor core.

Referring generally to the accompanying drawings, along the vertical axis of the reactor there is placed a through pipe 2, advantageously having a diameter of 4–6 cm. for a water-moderated reactor lattice. It will be understood that pipe 2 may be replaced by equivalent structures, such as a simple system of guides, or it may be completely missing in the event that all the lattice, including the moderator, is solid and has good mechanical properties.

Slidably received inside the pipe 2 is a column 1, advantageously having a length of 150 cm. for water-moderated lattices. Column 1 is formed from neutron multiplying material and, as best seen in FIGS. 5A and 5B, is advantageously constructed so that a hollow or void section, indicated by reference numeral 12 and the letter V, preferably about 10 cm. long, is provided at about one-third of the way down from the top of the column, and a multiplying material A identical to that constituting the lattice under examinaion is provided on a portion about 10 cm. in length on each side of the hollow section V (reference numeral 12), as well as on a portion of about 30 or more cms. in length at a point about two-thirds of the way down from the top of the column. The remainder of column 1 is advantageously formed of a composition similar but not necessarily identical to that of the lattice under examination, while having the same overall geometric dimensions, indicated by the letter B in FIGS. 5A and 5B.

Advantageously, the hollow section V (12) is formed of a Zircaloy box filled with helium gas.

According to the invention, the entire column 1 is caused to oscillate between two standard positions which are herein termed "Empty" and "Full," as is shown in FIGS. 5A and 5B. In the position "Empty," the hollow element V (12) is in the center 18 of the reactor core 6. In the position "Full," the test section 19, comprising the multiplying material A identical to that of the lattice under examination, is in the center 18 of the reactor core 6.

It will be understood that, in general, the composition and length of column 1 are such that when the column is displaced so that instead of the configuration "Full" being realized (FIG. 5B) the configuration "Empty" is realized (FIG. 5A), no changes occur in the central part of the reactor core, other than that the testing section 19 is replaced by the void section 12.

To the above end, cadmium sleeve members 13 are provided above and below the core of the reactor surrounding pipe 2, whereby the thermal neutrons generated by that portion of column 1 which comes out from the central zone of the reactor core during the oscillation are absorbed.

It will be apparent from the foregoing that the amplitude of the reactor's power oscillation as a result of the mechanical oscillation may be analysed by making use of standard calculation techniques, and is directly proportional to the reactivity variation due to the replacement of the testing section 19 with the void section 12. Therefore, by measuring the amplitudes of the reactor power oscillations as a function of the added amount of poison and assigning to them a positive sign (in the case of an increase of the power in the configuration "Full"), the amount of poison that gives a null amplitude of power oscillation may be determined by graphical interpolation.

In accordance with the invention, as applied to reactors having water-moderated lattices, as here preferably embodied, the amount of poison in the lattice is varied by varying the concentration of a borate solution dissolved in the moderator, so that a poisoning is obtained which is uniform and perfectly $1/V$ variable in a continuous manner, wherein V is the neutron velocity.

Referring now to the accompanying drawings in particular, in FIG. 1 there is shown the oscillating column 1 comprised of the multiplying material, as previously discussed, including the hollow or void section 12 filled with helium gas. Reference numeral 3 denotes a buffer zone, comprising a plurality of annular rings surrounding the pipe 2 containing the oscillating column 1, each of the rings being formed of cells of multiplying material identical in size and composition to test section 19 of the oscillating column, as previously described hereinabove. A push rod 4 is suitably connected to the oscillating column 1 by joint means 24. At reference numeral 5 there is illustrated additional multiplying lattice sections which are advantageously adjustable so as to obtain an axial flattening of the neutron flux, if desired. The reactor core is indicated by reference numeral 6 and the oscillating mechanism for column 1 is indicated generally by reference numeral 7. Advantageously, a room 9 is provided beneath the reactor for use in unloading of the oscillating column 1 and reference numerals 10, 11, indicate the water inlet and outlet, respectively.

Figure 2:
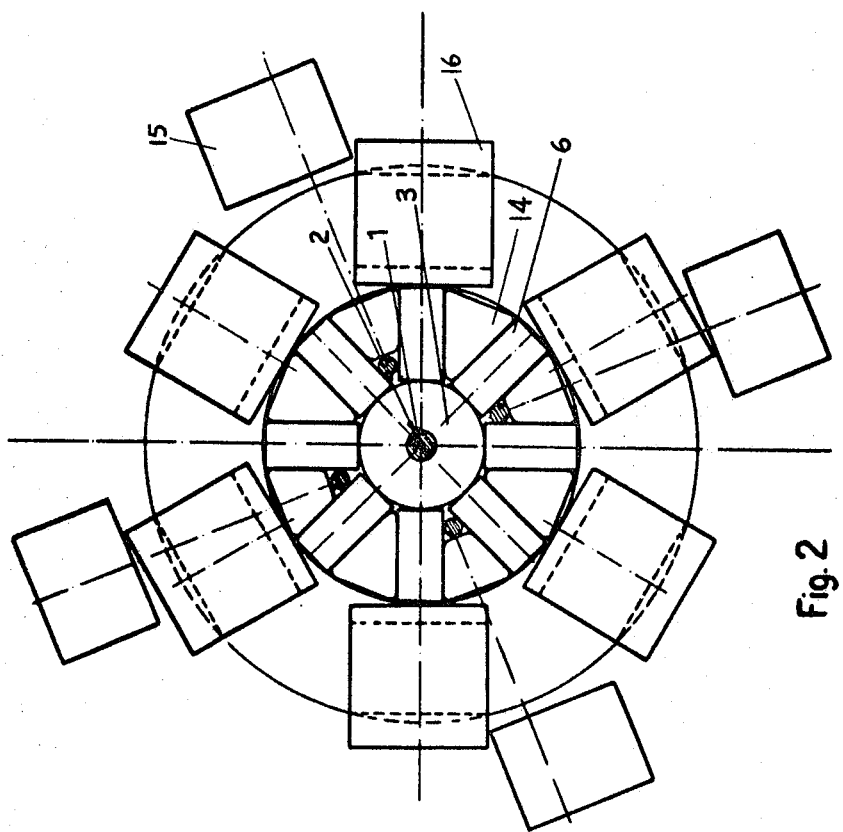
FIG. 2 is a top plan view of the apparatus and reactor core illustrated in FIG. 1.

FIG. 2 is a top plan view of the reactor core of FIG. 1 and illustrates the oscillating column 1 slidably received in pipe 2 in the center of the buffer zone 3. The reactor core fuel blocks 6 are placed around the buffer zone 3. Suitable spacing wedges of graphite 14 are placed among the fuel blocks 6 and reference numerals 15, 16 indicate, respectively, the drive means for the safety rods and the control rods of the reactor.

Figure 3:
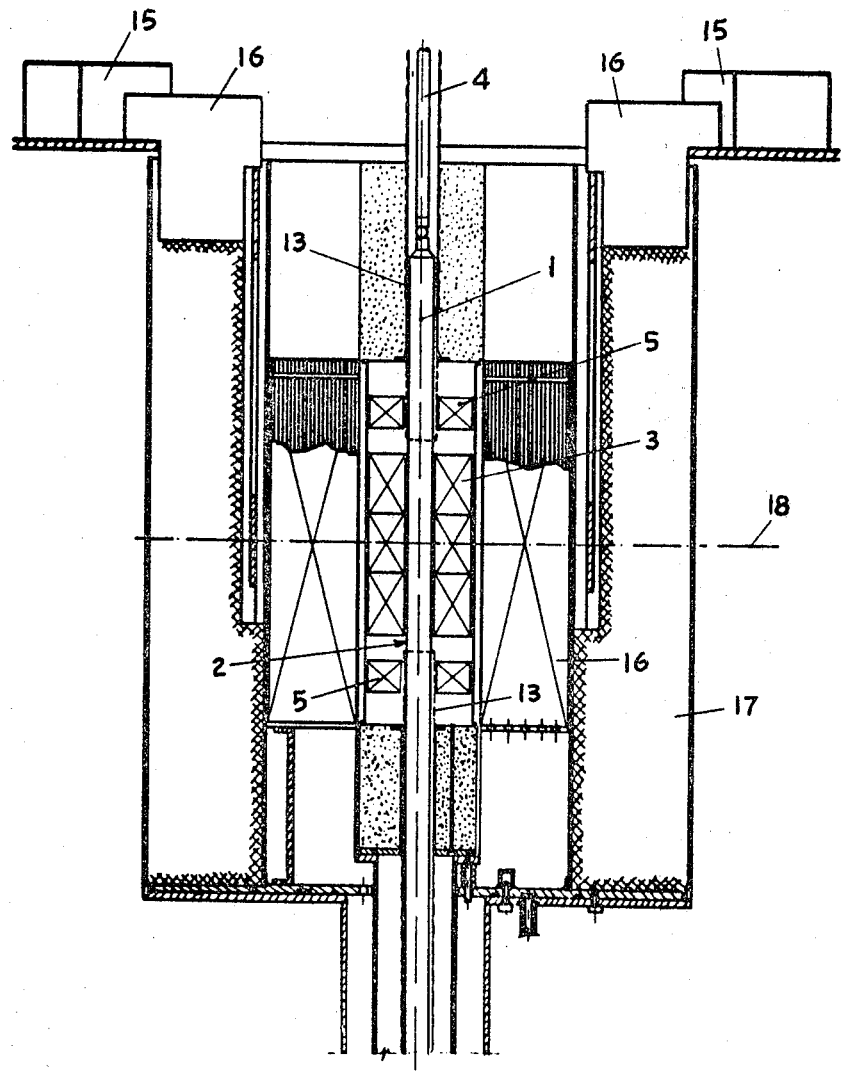
FIG. 3 is a fragmentary, enlarged vertical sectional view of the reactor core portion shown in FIG. 1, the view illustrating the oscillating column positioned so that the test section containing the multiplying material is located in the cented of the reactor core.

FIG. 3 is an enlarged vertical sectional view of the reactor illustrated in FIG. 1, illustrating the graphite reflector 17 of the reactor, the multiplying lattice 5 for obtaining axial flattening of the neutron flux, the buffer zone 3, the horizontal center line 18 of the reactor, and the cadmium sleeve members 13 positioned about pipe 2 above and below the reactor core.

Figure 4:
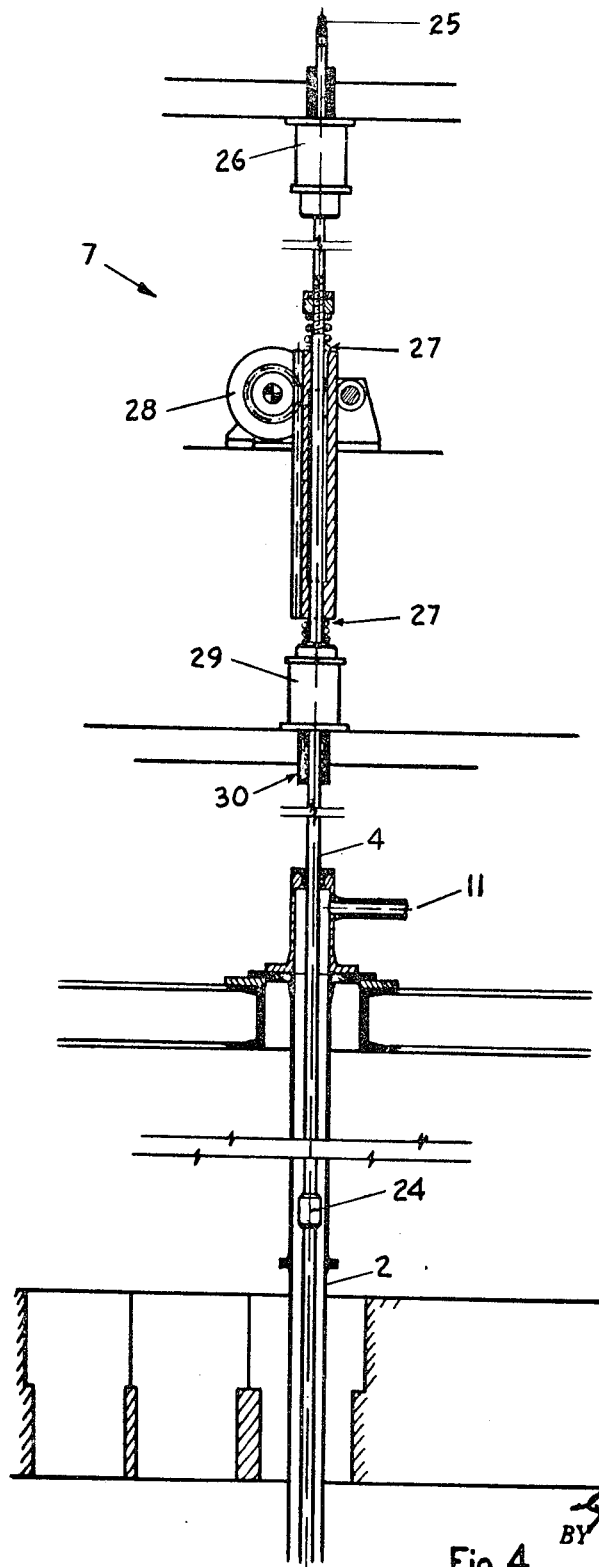
FIG. 4 is a fragmentary, enlarged vertical sectional view, partly in elevation, of the oscillating mechanism of the invention.

FIG. 4 illustrates a preferred embodiment of the oscillating mechanism 7, wherein reference numeral 25 schematically represents a manual drive for the engagement and the disengagement of the oscillating column from the oscillating mechanism, 26 is a single effect shock absorber with a mechanical stroke end, 27 is the electrical stroke end, 28 schematically represents a drive means equipped with an irreversible motor-reducer and an electromagnetic brake-clutch, 29 is a single effect shock absorber with a mechanical stroke end and spring return, and reference numeral 30 represents ball bearings journalling push rod 4 for axial displacement.

The electromagnetic clutch-brake group 28, advantageous in order to reduce to a minimum the shiftings of the system after the signal of the electrical stroke end 27, is mounted between the motor and the reducer (of irreversible type) in order to prevent certain uncontrolled movements in the case of casual absence of the excitation current. The presence of a resilient member between the driving mechanism and the connecting rod to the oscillating column, as well as the presence of suitable shock absorbers 26 and 29 and adjustable stroke ends, assure a very good positioning of the oscillating column in the two aforementioned positions.

It will be understood that, while the foregoing description has been primarily directed to the application of the invention to nuclear reactor systems having compact lattices, the invention is applicable to all lattice arrangements usually employed in nuclear reactors.

Accordingly, the invention in its broader aspects is not limited to the specific embodiment herein shown and described but departures may be made therefrom within the scope of the accompanying claims, without departing from the principles of the invention and without sacrificing its chief advantages.

We claim:
1. A method for measuring the infinite multiplication factor of a nuclear reactor lattice by determining the amount of poison which reduces the infinite multiplication factor of said lattice to unity, comprising:
   providing a column of multiplying material having a testing section identical to that of the lattice under examination and a void section;
   oscillating said column between a first position, whereat said testing section is in the center of the reactor core, and a second position, whereat said void section is in the center of the reactor core; and
   recording the oscillation amplitude of the reactor power as a function of the amount of neutron poison material in the reactor core;
   whereby, the amount of poison required for a null amplitude of power oscillation may be determined by graphical interpolation and, consequently, the infinite multiplication factor obtained by calculation.

2. The method as claimed in claim 1, wherein the nuclear reactor has a light water-moderated lattice and said poison is in the form of a borate solution, and the amount of said poison is varied by varying the concentration of said borate solution, whereby the $1/V$ relationship may be continuously varied.

3. Apparatus for measuring the infinite multiplication factor of a nuclear reactor lattice by determining the amount of poison which reduces said infinite multiplication factor of said lattice to unity, comprising:
   a multiplying material column;
   guide means slidably receiving said column therein;
   oscillating means for oscillating said column in said guide means along the vertical axis of the nuclear reactor core;
   buffer means located in said reactor core about said oscillating column guide means,
      said buffer means comprising a plurality of annular rings each of said rings being formed of cells of multiplying material identical in size and composition to the multiplying material of the reactor lattice, and
   cadmium sleeve members surrounding said guide means above and below said reactor core.

4. Apparatus as claimed in claim 3 wherein said multiplying column includes a test section of multiplying material identical to that of the nuclear reactor lattice and a void section, and said oscillating means oscillate said column between a first position, whereat said test section is in the center of the reactor core, and a second position, whereat said void section is in the center of the reactor core.

5. Apparatus as claimed in claim 4, wherein said void section and said test section are spaced from each other by a distance of about one-third the length of said multiplying column, said void section is surrounded on each immediate side thereof with a multiplying material identical to that of the nuclear reactor lattice, and the remainder of said multiplying column, exclusive of said test section, is formed of a multiplying material similar to that of the nuclear reactor lattice, but having the same overall geometrical dimensions.

6. Apparatus as claimed in claim 4, wherein said void section is formed by a hollow Zircaloy cell filled with helium gas.

References Cited

UNITED STATES PATENTS 2,781,307    2/1957    Wigner _____ 176—19

OTHER REFERENCES

D. J. Hughes, Pile Neutron Research, Addison-Wesley Pub. Co., Cambridge, Mass., 1953, pp. 196–204, inclusive.

REUBEN EPSTEIN, Primary Examiner